Aug. 29, 1933.  R. P. BENNETT  1,924,830
BRACKET
Filed Aug. 18, 1932

INVENTOR:
Rexford P. Bennett
BY Henry Van Arsdale
ATTORNEY

Patented Aug. 29, 1933

1,924,830

UNITED STATES PATENT OFFICE 1,924,830

BRACKET

Rexford P. Bennett, Honesdale, Pa., assignor to Clover Leaf Manufacturing Co., Honesdale, Pa., a corporation of Pennsylvania Application August 18, 1932. Serial No. 629,267

1 Claim. (Cl. 308—15)

This invention relates to brackets provided with adjustable bearing members having a plurality of bearing surfaces placeable selectively and separately in bearing position for supporting bobbins, spools, and the like, and provided with means for retaining the bearing members in adjusted position on the bracket.

The principal object of this invention is to provide a bracket of the character described and one of simplified and inexpensive construction; and to provide a bracket having locking means for bearing members adjustably supported thereon, and whereby the application of separate locking studs or pins is avoided, and the bracket may be made shorter in length, thus effecting a saving in material, weight and expense in construction.

A further object of this invention is to provide improved bearing member locking means on such brackets, and locking means formed directly on the bracket when the bracket is cast, thus avoiding the cost and expense of applying separate locking means to the bracket by a separate operation and simplifying the construction.

Other objects of this invention will be in part obvious and in part pointed out hereinafter.

Figure 1:
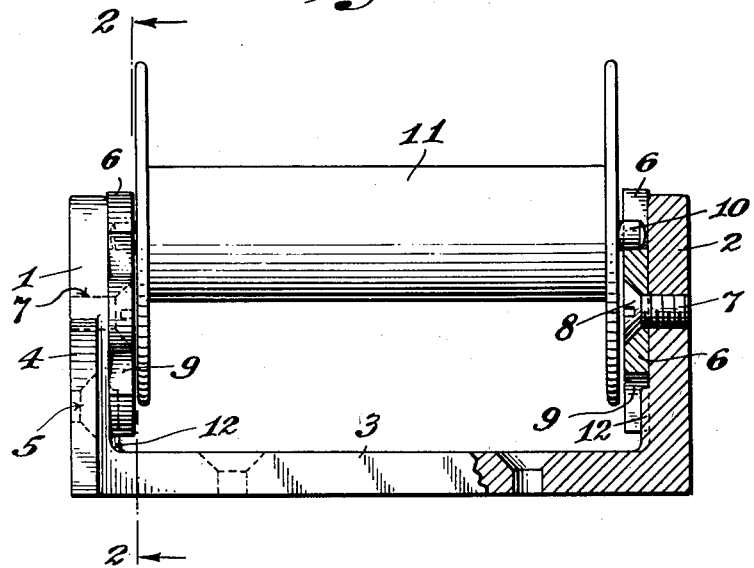
Figure 2:
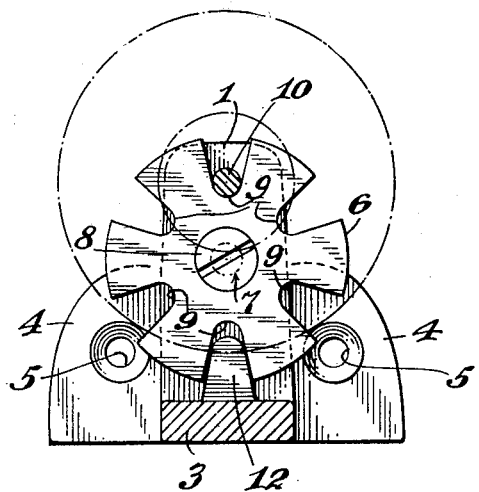

In order that a clearer understanding of this invention may be had, attention is hereby directed to the accompanying drawing, forming a part of this application, and illustrating certain possible embodiments of this invention, and in which:

Fig. 1 is a side view of a bobbin operatively supported on a structure embodying this invention, a portion of the structure being shown in section, and Fig. 2 is a sectional view thereof, and is taken on the line 2—2 of Fig. 1, the head of the bobbin being indicated by dot and dash lines, the pin being shown in section.

Similar reference characters refer to similar parts throughout both views of the drawing.

Referring to the drawing, there is shown therein a support or bracket comprising opposite end arms 1 and 2, connected at the base by an integral cross piece or cross bar 3. Arm 1 is formed with wings 4 having screw holes 5 for the purpose of attachment to a textile machine or other structure (not shown) in the conventional manner. Against the inner surface of each of the arms 1 and 2 is mounted a separate bearing member, such as 6, which are similar to each other. Each bearing member 6 is mounted on the adjacent arm by means of a screw 7 which extends through a hole in the center of the bearing member, and is in threaded engagement with a threaded hole formed in the arm, each screw having a head 8 seating in a recess provided therefor in the bearing member. Extending inwardly from the periphery of each bearing member are a plurality of spaced and separate bearing notches 9. When the screw 7 is loosened, the bearing member 6 may be rotated on the screw to place any one of the bearing notches 9 in uppermost position and, in the embodiment shown, a notch thus located is in service position and is adapted to rotatably support and provide a bearing surface for the end pin 10 (or the adjacent end of the shaft) of a bobbin 11 in service position on the supporting means.

Means are provided for locking the bearing members 6 in adjusted position on the arms 1 and 2, to prevent displacement of the bearing surfaces which have been set in operative, bobbin-supporting position. As shown, the locking means consist of an integral formation 12 at the base of the inner surface of each of the arms 1 and 2 and extending upwardly from the base 3 a sufficient distance to seat well in the lowermost bearing notch of each bearing member 6. The sides of the locking members 12 are so shaped that they will fit snugly in the engaged bearing notches and thus prevent objectional vibration or movement of the bearing members 6.

The locking portions 12 may be formed on the brackets in the casting of the bracket, thus eliminating the expense of providing separate locking studs or pins and securing them to the bracket by a separate operation. The disposition of the locking members 12 to engage the lowermost bearing notches instead of the uppermost notches, which are the ones engaged by a supported bobbin, allows the length of the bracket to be shortened to an extent equal to the combined distances the locking members 12 (or locking pins or studs secured to the arms 1 and 2 to engage in the uppermost bearing notches) project from these arms.

Accordingly, it is apparent that a simplified and inexpensive bracket is attained by this invention.

What I claim is:

A bracket of the character described having opposite arms, each adapted to support a multinotched bobbin bearing member disposed against the inner side of the arm, and having a base portion connecting said arms, an integral formation protruding inwardly from the inner side of each arm and protruding upwardly from the base portion and adapted to be engaged in a notch of a bobbin bearing member mounted against the inside of the arm, whereby the bearing members are held against rotation on the arms.

REXFORD P. BENNETT.